Patented Aug. 9, 1949

2,478,493

UNITED STATES PATENT OFFICE 2,478,493

PREPARATION OF ORGANIC SILICON COMPOUNDS

Arthur A. Levine, Niagara Falls, N. Y., assignor to E. I. du Pont de Nemours & Company, Wilmington, Del., a corporation of Delaware No Drawing. Application February 21, 1946, Serial No. 649,389

4 Claims. (Cl. 260—448.2)

This invention relates to the production of hydrocarbon-substituted silicon halides by reacting silicon and silicon-containing materials with hydrocarbon halides. More particularly, this invention relates to a process for enhancing the reactivity of silicon and silicon-containing materials for use in the above-said reaction.

The production of hydrocarbon-substituted silicon halides by reacting silicon and silicon-containing substances with hydrocarbon halides at temperatures between 100° C. and 500° C. has been suggested heretofore in the patent application of Norman D. Scott, Serial No. 550,315, filed August 19, 1944, now abandoned, and in U. S. Patents Nos. 2,380,995 to 2,381,002, inclusive.

Many grades of commercial silicon do not react readily with hydrocarbon halides. Furthermore, silicon often loses its reactivity for such halides.

It is an object of this invention to provide a process for enhancing and reviving the reactivity of silicon and silicon-containing substances for their reaction with hydrocarbon halides.

It is another object of this invention to provide a process for enhancing, reviving, and maintaining the reactivity of silicon and silicon-containing substances simultaneously with their reaction with hydrocarbon halides.

It is still another object of this invention to provide a process for enhancing and reviving the reactivity of silicon and silicon-containing substances before reacting the same with hydrocarbon halides.

Other objects of the invention will appear hereinafter.

The above objects may be accomplished, in general, by contacting the silicon-containing material with hydrogen fluoride. The hydrogen fluoride used in the treatment is preferably anhydrous, but may contain a small amount of water. Since the reaction between siliconic oxides and HF is a reversible one according to the equation:

$$SiO_2 + HF \rightleftharpoons SiF_4 + H_2O$$

it appears necessary only to maintain the HF in sufficient excess over water to direct the reaction to the right.

The silicon may be treated with liquid hydrogen fluoride, which has a boiling point of 19.4° C., at a temperature below the boiling point thereof, or at a pressure sufficiently above atmospheric to maintain the same liquid at the temperature used. The silicon material can, of course, be treated with gaseous hydrogen fluoride at any temperature above the boiling point of HF. Preferably, however, the treatment with gaseous hydrogen fluoride is carried out at a temperature above 100° C., for example, between 100° C. and 500° C., so as to vaporize and remove any water which may be formed during the treatment.

If liquid hydrogen fluoride is used in treating the silicon material at a temperature below the boiling point of HF, the length of the treatment period depends upon the reactivity and quantity of the silicon being treated, and the degree of reactivity desired. When gaseous hydrogen fluoride is employed, the length of the treatment period depends upon, in addition to the above conditions, the flow rate of the HF and the temperature of the system.

Although the applicant does not wish to be restricted to any theory regarding his invention, it is believed that the low reactivity of some silicon materials is due to the presence of $SiO_2$ or silicone compound on the surface of the silicon. These silicon oxide or silicone coatings prevent proper contact of the silicon with the hydrocarbon halide. A short treatment of the silicon material having a low reactivity with the HF will form water and gaseous $SiF_4$ which are vaporized from the material at a temperature of over 100° C.

The silicon material treated may be silicon itself or any of the silicon-containing materials used in carrying out the reaction between silicon and the hydrocarbon halide, as disclosed in the United States patents referred to above.

The hydrocarbon halides which may be used in the reaction with silicon to produce hydrocarbon-substituted silicon halides include the following substances:

Methyl chloride, $CH_3Cl$
Methyl bromide, $CH_3Br$
Methylene chloride, $CH_2Cl_2$
Ethyl chloride, $C_2H_5Cl$
Allyl chloride, $CH_2=CHCH_2Cl$
Methyl iodide, $CH_3I$
Fluoroform, $CHF_3$
Chloroform, $CHCl_3$
Carbon tetrachloride, $CCl_4$
Trichlorofluoromethane, $CCl_3F$
Ethyl iodide, $C_2H_5I$
1,4-dichlorobutane, $C_4H_8Cl$
Ethylene dichloride, $C_2H_4Cl_2$
Vinylidene chloride, $CH_2=CCl_2$
n-Propyl bromide, $C_3H_7Br$
Iso-propyl chloride, $CH_3CHClCH_3$
n-Butyl chloride, $C_4H_9Cl$
Cyclopentyl bromide, $C_5H_9Br$ Cyclohexyl chloride, $C_6H_{11}Cl$
Octyl chloride, $C_8H_{17}Cl$
Decyl iodide, $C_{10}H_{21}I$
Chlorobenzene, $C_6H_5Cl$
Fluorobenzene, $C_6H_5F$
Dichlorobenzenes, $C_6H_4Cl_2$
Dibromobenzenes, $C_6H_4Br_2$
Diiodobenzenes, $C_6H_4I_2$
Chloronaphthylenes, $C_{10}H_7Cl$
Dichloronaphthalenes, $C_{10}H_6Cl_2$
Alpha-fluoronaphthalene, $C_{10}H_7F$
Benzyl bromide, $C_6H_5CH_2Br$
Alpha-chloro-p-xylene, $C_6H_4(CH_3)CH_2Cl$
p-Xylylene chloride, $C_6H_4(CH_2Cl)_2$
Benzyl chloride, $C_6H_5CH_2Cl$ The treatment of silicon material with HF will enhance the reactivity thereof for reaction with the above and other hydrocarbon halides.

The following examples are given to illustrate certain preferred processes for carrying out the present invention, it being understood, of course, that the invention is not to be limited to the details of the examples.

Example I

Finely divided elemental silicon (100 mesh or finer) is dispersed, in the form of a dense cloud, within a cylindrical rotary reactor of about five liters volume by a continuous rotary motion of the reactor. Methyl chloride vapors are allowed to pass through this silicon "cloud" at a rate of one gram per minute and at a temperature maintained between 350° C. and 425° C. The vapor issuing from the reactor is condensed in a water-cooled condenser and fractionally distilled. Atmospheric distillation of the crude reaction products yields, in addition to recovered methyl chloride, trichlorosilicane, $HSiCl_3$, boiling point 31° to 33° C.; silicon tetrachloride, $SiCl_4$, boiling point 56° to 58° C.; monomethyl silicon trichloride, $CH_3SiCl_3$, boiling point 65.5° C.; and dimethyl silicon dichloride, $(CH_3)_2SiCl_2$, boiling point 69° C. Based upon unrecovered methyl chloride, a 66% conversion was realized, indicating a fair initial reactivity of the silicon.

Operations were discontinued overnight, but the system was maintained at reaction temperatures under an atmosphere of standard high purity nitrogen (3% oxygen). On the following morning, methyl chloride vapors were again introduced into the system, and the run was continued for six hours longer. No reaction of the methyl chloride was realized. Operations were discontinued overnight.

On the following morning, operations were resumed and a slow stream of anhydrous hydrogen fluoride was introduced in the system simultaneously with the methyl chloride. A reaction between the methyl chloride and silicon, as evidenced by the condensation of crude product vapors in the water-cooled condenser, was realized after three and one-quarter hours. At the end of four and one-half hours, the hydrogen fluoride flow was shut off and the run was continued for one and three-quarter hours longer, during which time the silicon remained reactive. Discontinuing operations overnight, the system was maintained under an atmosphere of methyl chloride vapors to prevent oxygen and moisture from contacting the silicon.

The next day, a check run was made to determine the reactivity of the silicon. Methyl chloride vapors were passed into the system at 405° C. for six hours in the absence of hydrogen fluoride. Based on unrecovered methyl chloride, a 52% conversion was realized in a single pass. Since the silicon was previously shown to be unreactive to methyl chloride, the above conversion yield demonstrates the improved reactivity as caused by treatment of the silicon with hydrogen fluoride.

Example II

Methyl chloride vapors were passed through a non-reactive silicon for a period of two hours at 350° C. to 400° C. in an apparatus similar to that described in Example I.

The absence of condensate in the condenser indicated that very little or no reaction was being realized. Anhydrous hydrogen fluoride was then introduced into the system at a slow rate. After twenty minutes, the crude product vapors began to condense. It was found that as the flow of hydrogen fluoride was increased, the rate of product condensation also increased, thus indicating that a greater conversion of methyl chloride was being realized. The run was terminated at the end of eight hours. A second run was made under similar conditions to evaluate the reactivity of the silicon. Based on methyl chloride consumed, 52.7% conversion was realized, thus showing that a considerable reactivity of the silicon had been accomplished.

The hydrogen fluoride need not be introduced into the system simultaneously with the hydrocarbon halide. If the silicon or silicon-containing substance has a low initial reactivity, or a low reactivity as a result of operation over an extended period of time, it may be treated with the hydrogen fluoride before it is reacted with the hydrocarbon halide.

Reference in the specification and claims to parts, proportions and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. In a process for the production of a hydrocarbon-substituted silicon halide by reacting silicon with a hydrocarbon halide the step of enhancing the reactivity of the silicon material having a relatively low reactivity which comprises contacting the same with anhydrous hydrogen fluoride.

2. In a process for the production of a hydrocarbon-substituted silicon halide by reacting silicon with a hydrocarbon halide the step of enhancing the reactivity of the silicon material having a relatively low reactivity which comprises contacting the same with gaseous anhydrous hydrogen fluoride.

3. In a process for the production of a hydrocarbon-substituted silicon halide by reacting silicon with a hydrocarbon halide the step of enhancing the reactivity of the silicon material having a relatively low reactivity which comprises contacting the same with gaseous anhydrous hydrogen fluoride at a temperature of at least 100° C.

4. In a process for the production of a hydrocarbon-substituted silicon halide by reacting silicon with a hydrocarbon halide the step of enhancing the reactivity of the silicon material having a relatively low reactivity which comprises contacting the same with liquid anhydrous hydrogen fluoride.

ARTHUR A. LEVINE.

REFERENCES CITED

The following references are of record in the file of this patent:

UNITED STATES PATENTS

| Number | Name | Date |
|---|---|---|
| 2,380,995 | Rochow I | Aug. 7, 1945 |
| 2,380,996 | Rochow | Aug. 7, 1945 |
| 2,380,997 | Patnode | Aug. 7, 1945 |
| 2,380,998 | Sprung | Aug. 7, 1945 |
| 2,380,999 | Sprung | Aug. 7, 1945 |
| 2,381,000 | Patnode | Aug. 7, 1945 |
| 2,381,001 | Patnode | Aug. 7, 1945 |
| 2,381,002 | Patnode | Aug. 7, 1945 |
| 2,383,818 | Patnode | Aug. 28, 1945 |
| 2,389,931 | Reed et al. | Nov. 17, 1945 |

OTHER REFERENCES

Rochow, Jour. Amer. Chem. Soc., vol. 67 (1945), page 1772.